United States Patent
Takeda

(10) Patent No.: US 7,346,730 B2
(45) Date of Patent: Mar. 18, 2008

(54) MOBILE ELECTRONIC DEVICE

(75) Inventor: Hajime Takeda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 11/134,452

(22) Filed: May 23, 2005

(65) Prior Publication Data
US 2005/0262315 A1 Nov. 24, 2005

(30) Foreign Application Priority Data
May 24, 2004 (JP) ............... 2004-153214

(51) Int. Cl.
*G06F 12/00* (2006.01)
(52) U.S. Cl. ............... 711/102; 711/100; 711/103; 711/113; 711/115; 711/154; 711/153; 455/550.1; 455/558
(58) Field of Classification Search ............... 711/100, 711/102–103, 113–115, 153–154
See application file for complete search history.

(56) References Cited

U.S. PATENT DOCUMENTS

| | | | |
|---|---|---|---|
| 6,236,591 B1 | 5/2001 | Pockrandt | |
| 6,363,455 B2 * | 3/2002 | Kusakabe et al. | 711/103 |
| 6,728,791 B1 | 4/2004 | Young | |
| 2002/0026566 A1 | 2/2002 | Awada et al. | |
| 2004/0037156 A1 | 2/2004 | Yoneda et al. | |
| 2004/0093592 A1 * | 5/2004 | Rao | 717/168 |

FOREIGN PATENT DOCUMENTS

| | | |
|---|---|---|
| DE | 38 05 291 A1 | 9/1988 |
| EP | 0398545 A1 | 11/1990 |
| GB | 2 258 931 A | 2/1993 |
| JP | 2003-114831 A | 4/2003 |
| JP | 2004-139503 | 5/2004 |
| WO | WO 03/025748 A2 | 3/2003 |
| WO | WO 03/025754 A2 | 3/2003 |

OTHER PUBLICATIONS

Australian Search Report dated Feb. 24 for Appln. No. 2005027826.

European Search Report dated Aug. 5, 2005 for Appln. No. 05009526.4-222.1.

* cited by examiner

*Primary Examiner*—Sanjiv Shah
*Assistant Examiner*—Zhuo H Li
(74) *Attorney, Agent, or Firm*—Pillsbury Winthrop Shaw Pittman, LLP

(57) ABSTRACT

In a memory, first and second data areas are set as an area which stores one data item and a management area which stores determination information used to determine which one of the first and second data areas stores the newest data is additionally set. In the process of writing data into the memory, data is written into one of the data areas which stores data determined not to be the newest data based on the determination information and identification information is updated when the data writing process is correctly terminated.

6 Claims, 5 Drawing Sheets

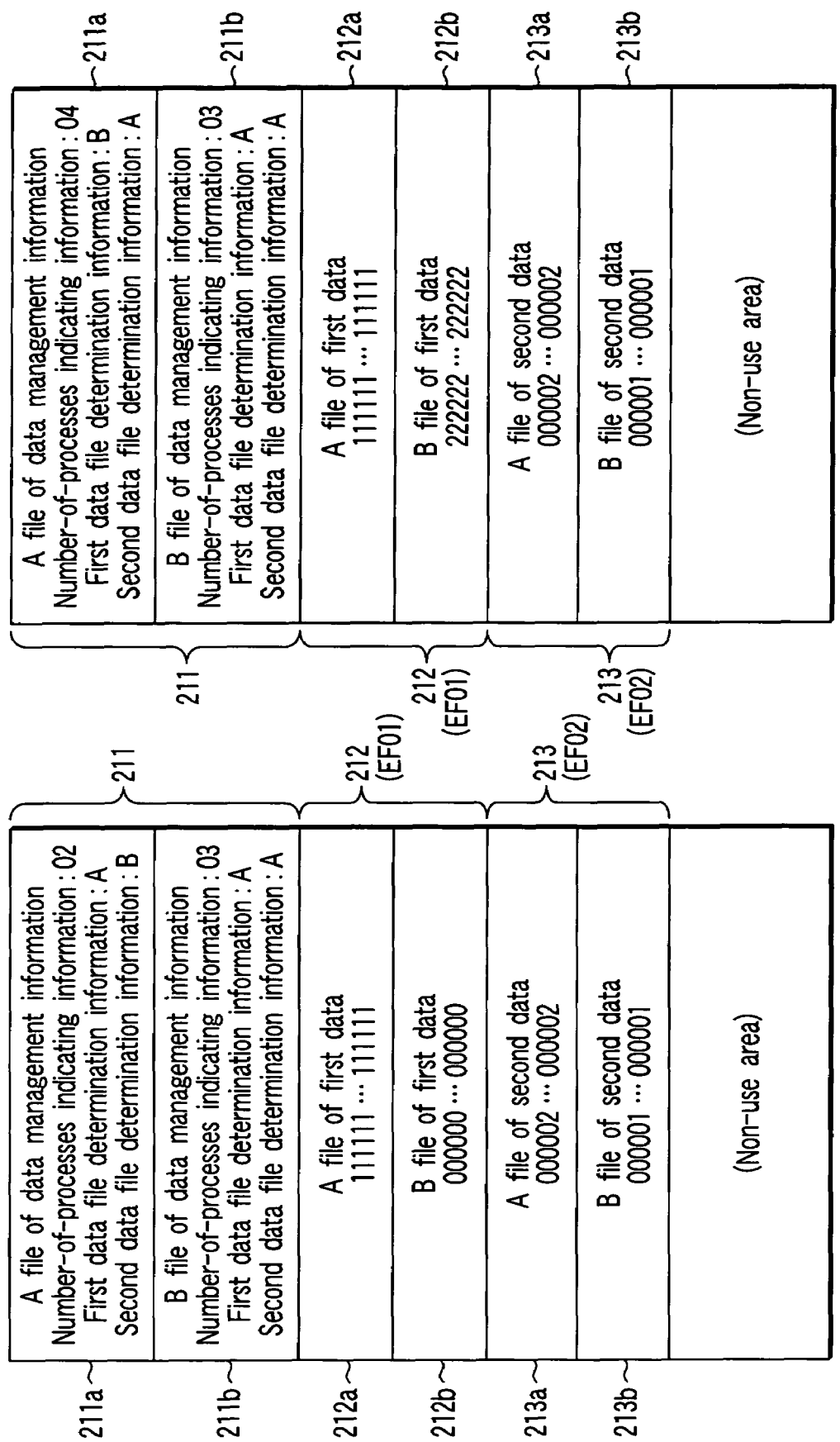

MOBILE ELECTRONIC DEVICE

CROSS-REFERENCE TO RELATED APPLICATIONS

This application is based upon and claims the benefit of priority from prior Japanese Patent Application No. 2004-153214, filed May 24, 2004, the entire contents of which are incorporated herein by reference.

BACKGROUND OF THE INVENTION

1. Field of the Invention

This invention relates to a mobile electronic device such as an IC card containing an IC chip which includes a data programmable or rewritable nonvolatile memory, a control element such as a CPU and an interface which inputs/outputs data, for example.

2. Description of the Related Art

Conventionally, some of IC cards used as mobile electronic cards are operated on power supply voltages supplied from a host device (card reader/writer). With this type of IC card, if the power supply voltage supplied from the host device is unstable, a process of writing data into the nonvolatile memory fails in some cases. Even if such a data writing failure occurs, the following data write ensuring method is conventionally proposed to ensure data in the nonvolatile memory.

As the conventional data write ensuring method, there is provided a method for writing old data written in a target area into which new data is to be written into another area, then writing the new data into the target area and finally writing a status indicating that the new data writing process has been completed into a management information area. With this method, it is necessary to perform the process of writing data into the nonvolatile memory three times. Therefore, with this method, it becomes difficult to enhance the operation speed of whole process of writing new data.

Further, in the conventional data write ensuring method, the process of writing data into the nonvolatile memory is ensured for each preset physical storage area (page). Therefore, if one data item having significance lies over a plurality of pages or divided and stored over a plurality of files, it is difficult to ensure whole data.

BRIEF SUMMARY OF THE INVENTION

An object of this invention is to provide a mobile electronic device capable of enhancing the operation speed of the process of writing data into a memory while data is ensured.

According to one aspect of this invention, there is provided a mobile electronic device comprising a first data memory which stores data, a second data memory which stores data equivalent to data stored in the first data memory, a determining section which determines which one of data stored in the first data memory and data stored in the second data memory is the newest data, and a writing section which performs a process of writing data into one of the first and second data memories which stores data determined not to be the newest data by the determining section.

BRIEF DESCRIPTION OF THE SEVERAL VIEWS OF THE DRAWING

FIG. 7 is a diagram showing an example of the data configuration in the data memory before the data writing process;

FIG. 8 is a diagram showing an example of the data configuration in the data memory after the data writing process.

DETAILED DESCRIPTION OF THE INVENTION

There will now be described an embodiment of this invention with reference to the accompanying drawings.

Figure 1:
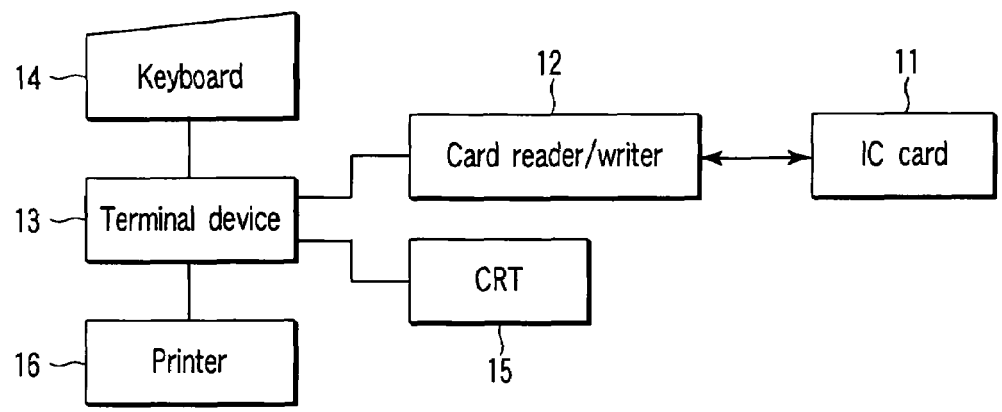
FIG. 1 is a block diagram showing an example of the configuration of an IC card system which deals with an IC card as a mobile electronic device according to an embodiment of this invention.

FIG. 1 shows an example of the configuration of an IC card system which deals with an IC card as a mobile electronic device according to the present embodiment.

The IC card system includes an IC card 11, card reader/writer 12, terminal device 13, keyboard 14, CRT display device 15, printer 16 and the like. The IC card 11 can communicate with the terminal device 13 via the card reader/writer 12. The terminal device 13 is configured by a computer or the like. The terminal device 13 is connected to the keyboard 14, CRT display device 15 and printer 16.

Figure 2:
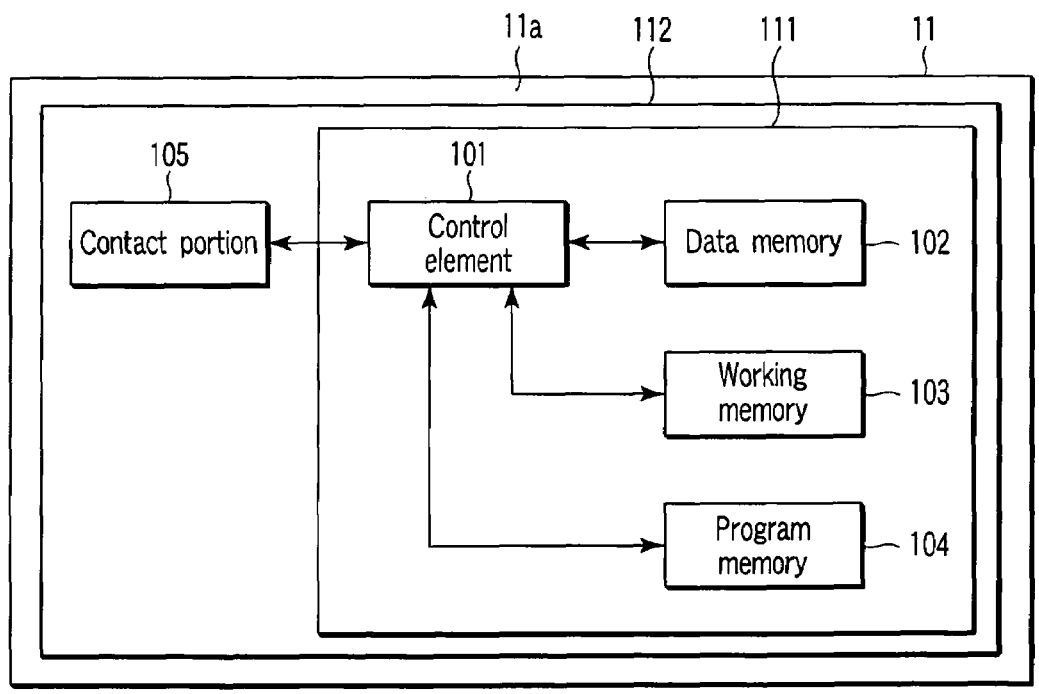
FIG. 2 is a block diagram schematically showing the configuration of the IC card.

FIG. 2 is a diagram showing an example of the configuration of the IC card 11.

As shown in FIG. 2, the IC card 11 includes a control element 101, data memory 102, working memory 103, program memory 104, contact portion 105 and the like.

Further, the control element 101, data memory 102, working memory 103 and program memory 104 are configured by one IC chip (or a plurality of IC chips) 111. The IC chip 111 and contact portion 105 configure an IC module 112 which is integrally formed into a module. The IC module 112 is embedded in a casing of the IC card main body 11a. That is, the IC card 11 has the IC module 112 with the IC chip 111 contained therein.

The control element 101 includes a CPU or the like. The control element 101 is a control section which controls the whole portion of the IC card 11. The data memory 102 is configured by a nonvolatile memory such as a flash memory or EEPROM whose storage contents can be rewritten. The data memory 102 is used to store various data items. The working memory 103 is a volatile memory in which processing data is temporarily stored. The program memory 104 is configured by a nonvolatile memory such as a mask ROM whose storage contents cannot be rewritten. In the program memory 104, a plurality of control programs such as application programs and control data are previously stored. The contact portion 105 is a communication interface with the card reader/writer 12. When the IC card 11 is a contact type IC card, the contact portion 105 is configured by an interface which is electrically brought into contact with the card reader/writer 12.

In the present embodiment, the explanation is made when a contact type IC card is used as shown in FIG. 2. However, in the present embodiment, a non-contact type IC card can also be applied in the same manner. For example, when the present embodiment is applied to a non-contact type IC card, the contact portion 105 includes a communication control portion which controls radio communication and an antenna which receives/transmits radio waves for radio communication under the control of the communication control portion in the configuration of FIG. 3.

Next, the configuration of data stored in the data memory 102 is explained.

The data memory 102 stores various data items relating to a plurality of application programs (which are hereinafter simply referred to applications) in file units. In the data memory 102, folders for respective applications are set. The folder set for each application is defined as an application dedicated file (ADF). In the folder defined by the ADF, an elementary file (EF) in which data actually used in the application is stored is provided.

Figure 3:
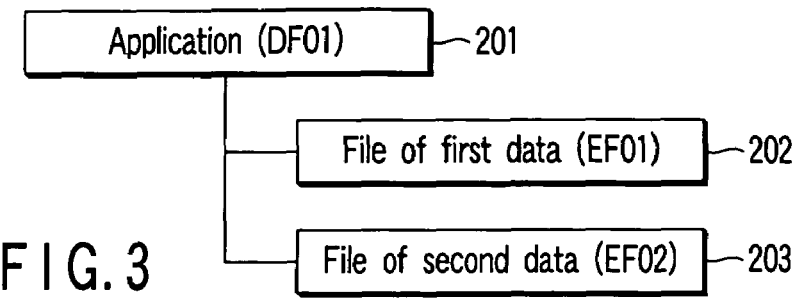
FIG. 3 is a diagram schematically showing the configuration of a data memory.

FIG. 3 shows an example of the configuration of data relating to one application.

In FIG. 3, the example of the configuration of data relating to one application stored in the data memory 102 is shown. As shown in FIG. 3, the folder of the application is defined by an ADF (the DF number thereof used as identification information is "01") 201. In the ADF 201, an EF (the DF number thereof used as identification information is "01") 202 and an EF (the DF number thereof used as identification information is "02") 203 are provided. The EF 202 is a file which stores first data. The EF 203 is a file which stores second data.

Figure 4:
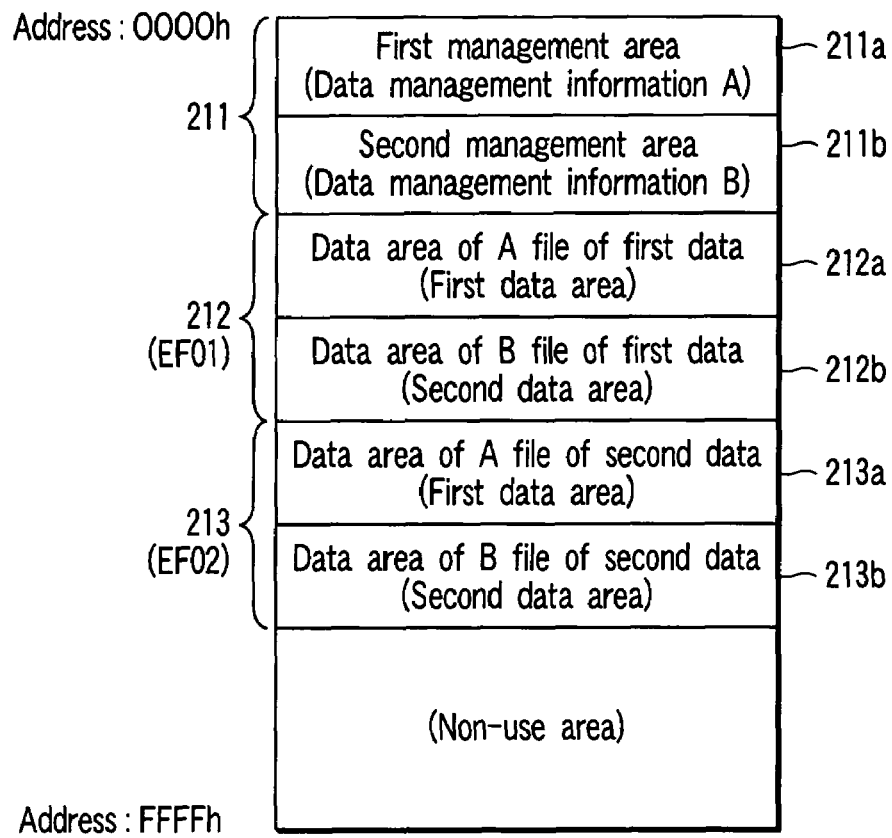
FIG. 4 is a diagram showing a data storage example of the data memory.

FIG. 4 shows a data storage state in the data memory 102.

An example of the file configuration on the data memory 102 shown in FIG. 4 corresponds to the example of the file configuration of FIG. 3. A data area 212 of the first data file 202 of first data corresponding to EF01 shown in FIG. 3 is configured by a first data area (first memory) 212*a* and second data area (second memory) 212*b*. In the present embodiment, data stored in the first data area (first memory) 212*a* is called an A file of the first data and data stored in the second data area 212*b* is called a B file of the first data.

That is, a data area (first memory) 202*a* of the A file of the first data and a data area (second memory) 202*b* of the B file of the first data are set on the data memory 102 as the data area 212 which stores the first data to be stored in EF01. In other words, the data area which stores the first data is formed in a double-layered form on the data memory 102.

Likewise, a data area 213 of a file 203 of second data corresponding to EF02 shown in FIG. 3 is configured by a first data area (first memory) 213*a* and second data area (second memory) 213*b*. In this case, data stored in the first data area (first memory) 213*a* is called an A file of the second data and data stored in the second data area (second memory) 203*b* is called a B file of the second data.

That is, a data area (first memory) 213*a* of the A file of the second data and a data area (second memory) 213*b* of the B file of the second data are set on the data memory 102 as the data area 213 which stores the second data to be stored in EF02. In other words, the data storage area which stores the second data is formed in a double-layered form on the data memory 102.

Further, on the data memory 102, a management area 211 which stores data management information used to manage data stored in each data area is set. The data management information stored in the management area 211 is information used to manage whether the newest data is written in the first data areas (A file) 212*a*, 213*a* or the second data areas (B file) 21*b*, 213*b*.

Further, the management area 211 which stores data management information includes a first management area 211*a* and second management area 211*b*. In this example, data stored in the first management area 213*a* is called data management information A and data stored in the second management area 211*b* is called data management information B.

That is, the storage area 211*a* of the data management information A and the storage area 211*b* of the data management information B are set on the data memory 102 as the management area 211 which stores data management information. In other words, the storage area of data management information is formed in a double-layered form on the data memory 102.

Next, data management information is explained.

Figure 5:
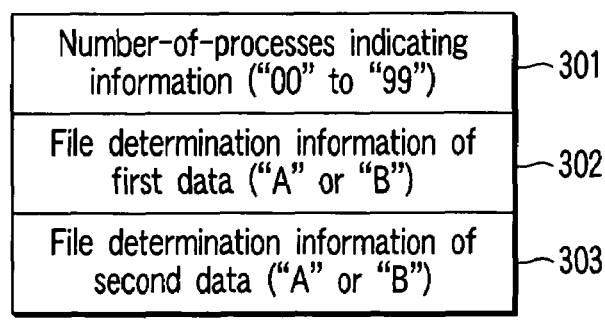
FIG. 5 is a diagram showing the configuration of data management information.

FIG. 5 shows a concrete example of the data management information. In FIG. 5, an example of the configuration of the data management information for data of the configuration shown in FIG. 4 is shown. As shown in FIG. 5, the data management information includes number-of-processes indicating information 301, file determining information 302 of first data and file determining information 303 of second data.

The number-of-processes indicating information 301 is information indicating the number of data writing processes. The first data file determining information 302 is information indicating one of the first data area (A file) 212*a* and second data area (B file) 212*b* in which the newest data is written as the first data. The second data file determining information 303 is information indicating one of the first data area (A file) 213*a* and second data area (B file) 203*b* in which the newest data is written as the second data.

Next, the process in the IC card 11 is schematically explained.

The IC card 11 in the present embodiment is operated on power supply voltage supplied from the card reader/writer 12. The IC card 11 operated on the power supply voltage supplied from the card reader/writer 12 performs a process in response to a command supplied from the terminal device 13 via the card reader/writer 12. Further, the IC card 11 transmits the result of the process corresponding to the received command as a response to the terminal device 13 via the card reader/writer 12.

The concrete process of the IC card 11 is divided into a data readout process which transmits data stored in the data memory 102 or the like to the exterior and a data writing process which writes data received together with a command into the data memory 102.

Next, the data writing process in the IC card 11 is explained.

In the IC card 11, a process of writing data into the data memory 102 as a nonvolatile memory or the like is performed while data is ensured.

Figure 6:
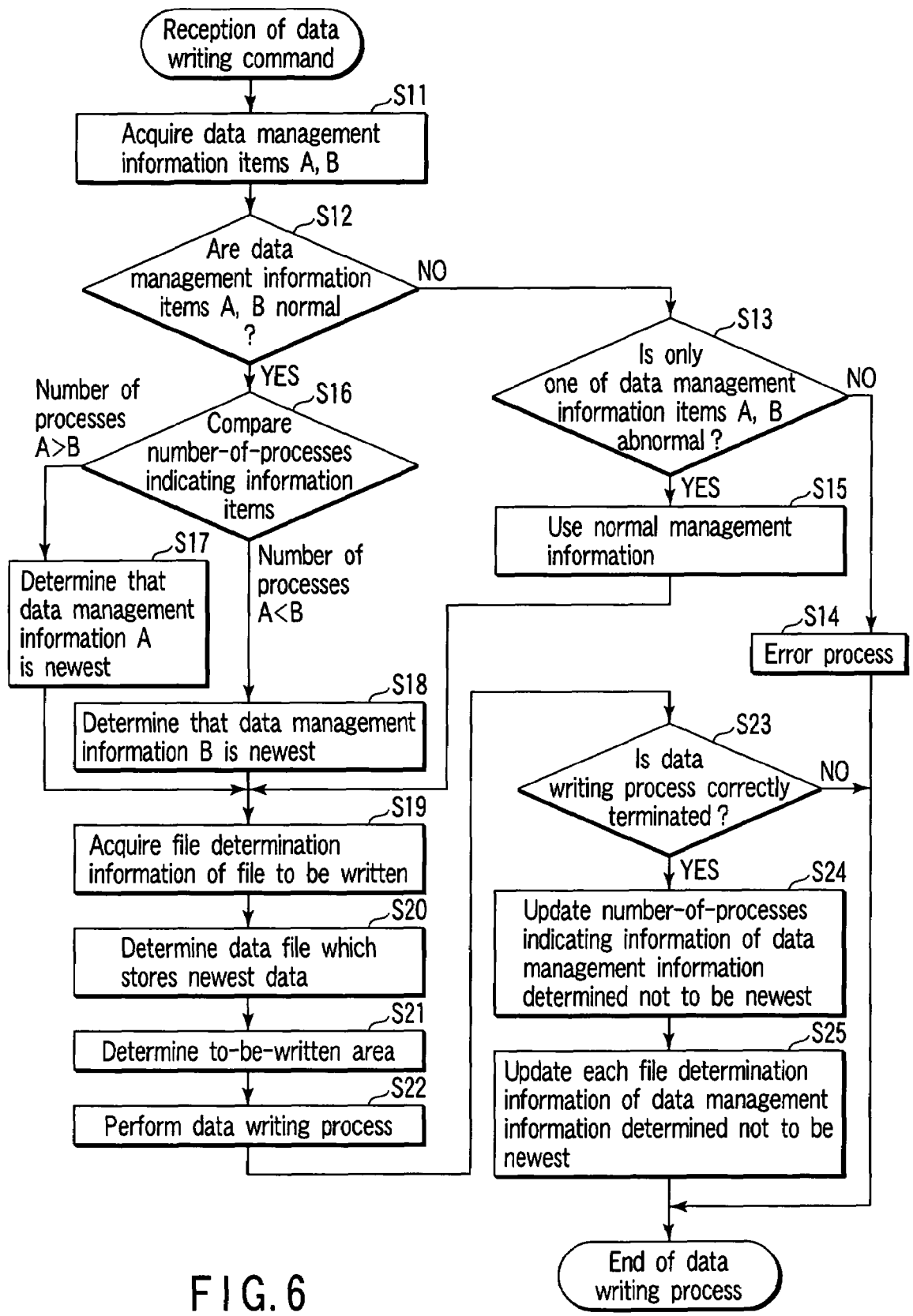
FIG. 6 is a flowchart for illustrating the procedure of a data writing process.

FIG. 6 is a flowchart for illustrating the procedure of the data writing process in the IC card 11. Further, FIGS. 7 and 8 are diagrams showing examples of data stored in the data memory 102. FIG. 7 shows an example of data stored in the data memory 102 before the data writing process. FIG. 8 shows an example of data stored in the data memory 102 after the data writing process. An example of the data writing process in the IC card 11 is explained below with reference to FIGS. 6, 7 and 8.

First, it is assumed that the IC card 11 receives a write command which requests a data writing process from the card reader/writer 12 via the contact portion 105. If the write command which requests the data writing process is received, the control element 101 of the IC card 11 acquires data management information A stored in the first management area 211a and data management information B stored in the second management area 211b in the management area 211 of the data memory 102 (step S11).

If the data management information of the A file and the data management information of the B file are acquired, the control element 101 determines whether the data management information items A and B are normal or not (step S12). For example, whether the data management information is normal or not is determined according to whether or not number-of-processes indicating information used as the data management information A or B is set to an abnormal value. For example, when the number-of-processes indicating information is expressed by a hexadecimal number (which is a number ranging from "01" to "FE", for example), the data management information is determined to be abnormal if the number-of-processes indicating information is set to an abnormal number such as "00 (which is expressed by '00000000' in binary notation)" or "FF (which is expressed by '11111111' in binary notation)". This is because there occurs a possibility that the number-of-processes indicating information in the data management information is rewritten to an abnormal value if a data writing failure occurs.

When it is determined in the above determination process that both of the data management information items A and B are abnormal ("NO" in the step S13), the control element 101 determines the data writing process for the write command as an erroneous process. In this case, as an error process, the control element 101 returns a status to the effect that a write error has occurred because the data management information is abnormal to the card reader/writer 12 (step S14).

When it is determined in the above determination process that only one of the data management information items A and B is abnormal ("YES" in the step S13), the control element 101 selects (uses) the data management information which is determined not to be abnormal (step S15) and proceeds the process to the step S19 which will be described later.

When it is determined in the above determination process that both of the data management information items A and B are normal ("YES" in the step S12), the control element 101 compares the number-of-processes indicating information of the data management information A with the number-of-processes indicating information of the data management information B (step S16). The comparison process is a process for permitting the control element 101 to determine the data management information having information which indicates a larger number of processes as the newest data management information. That is, the control element 101 determines one of the data management information items A and B which has information indicating the larger number of processes as the newest data management information.

Therefore, when it is determined as the result of comparison that the number-of-processes indicating information of the data management information A is larger than that of the data management information B (A>B in the step S16), the control element 101 determines the data management information A as the newest data management information (step S17). Further, when it is determined as the result of comparison that the number-of-processes indicating information of the data management information B is larger than that of the data management information A (A<B in the step S16), the control element 101 determines the data management information B as the newest data management information (step S18).

For example, in the example of FIG. 7, the number-of-processes indicating information of the data management information A is "2" and the number-of-processes indicating information of the data management information B is "3". In this case, the control element 101 determines that the number-of-processes indicating information of the data management information B is larger than that of the data management information A. As a result, the control element 101 determines that the data management information B stored in the first management area 211b is the newest data management information for data items shown in FIG. 7.

In the number-of-processes indicating information 301, it is permissible not to set an upper limit. For example, when the number-of-processes indicating information 301 is expressed by use of two digits in the hexadecimal notation (for example, a value ranging from "01" to "FE"), the control element 101 is only required to set a next value of "FE" to "01" as a value of the number-of-processes indicating information 301. In this case, it is only required for the control element 101 to determine that "01" is larger than "FE" as the value of the number-of-processes indicating information 301.

When determining the newest data management information, the control element 101 acquires file determining information (file determining information of a file which is a to-be-written object) of data to be written based on the newest data management information (step S19). When the file determining information of the file which is the to-be-written object is acquired, the control element 101 determines whether a data area of data which is last written (newest data) is the first data area (A file) or second data area (B file) based on the file determining information (step S20).

For example, in examples of FIGS. 7 and 8, the file determining information of the first data as the data management information contains information which identifies one of the first data area (A file) 212a and second data area (B file) 212b in which the newest data as the first data is stored. Likewise, the file determining information of the second data as the data management information contains information which identifies one of the first data area (A file) 213a and second data area (B file) 213b in which the newest data as the second data is stored.

Further, in the example of FIG. 7, the file determining information of the first data is set to "A" in the data management information B which is determined as the newest data management information. In this case, the control element 101 determines that the newest data is written in the first data area (A file) 212a for the first data. Likewise, in the example of FIG. 7, the file determining information of the second data is set to "A" in the newest data management information B. In this case, the control element 101 determines that the newest data is written in the first data area (A file) 213a for the second data.

When the data area (file) in which the newest data is stored is determined in the above determining process, the control element 101 determines a data area (file) in which data other than the newest data is written as a to-be-written area (step S21). In the example of FIG. 7, the newest data is written in the first data area (A file) 212a for the first data. Therefore, the second data area (B file) 212b is determined as a to-be-written area at the present time for the first data. Likewise, in the example of FIG. 7, the newest data is written in the first data area (A file) 213a for the second data. Therefore, the second data area (B file) 213b is determined as a to-be-written area at the present time for the second data.

If the to-be-written area is determined, the control element 101 performs the write process for data which is to be written into the above area at the present time (step S22). When the data writing process is correctly terminated ("YES" in the step S23), the control element 101 performs a process of updating the data management information (steps S24, S25). In the data management information updating process, the data management information which is determined to be the newest information keeps the state as it is and the data management information which is determined not to be the newest information is updated. For the data management information which is determined not to be the newest, the number-of-processes indicating information is updated (step S24) and each file determining information is updated (step S25).

That is, the control element 101 rewrites the number-of-processes indicating information in the data management information which is determined not to be the newest information to a value obtained by adding "+1" to the number-of-processes indicating information of the data management information which is determined to be the newest information (step S24). Further, the control element 101 rewrites each file determining information in the data management information which is determined not to be the newest information (step S25). The control element 101 rewrites file determining information of written data in the data management information which is determined not to be the newest information to information indicating a data area (file) in which data is written at the present time. Further, the control element 101 rewrites each file determining information of each data which is not written at the present time in the data management information which is determined not to be the newest information to the same information as each file determining information in the data management information which is determined to be the newest.

For example, when first data is rewritten in the data memory 102 shown in FIG. 7, the control element 101 rewrites the data management information A of the first management area 211a which is determined not to be the newest information into a state as shown in FIG. 8. That is, by comparing FIG. 8 with FIG. 7, it is understood that the number-of-processes indicating information of the data management information A shown in FIG. 8 is rewritten into "4 (the number-of-processes indicating information of the data management information B "3"+"1")". Further, by comparing FIG. 8 with FIG. 7, it is understood that file determining information of the first data in the data management information A shown in FIG. 8 is rewritten to "B (information indicating a data area in which the first data is written)" and file determining information of the second data in the data management information A shown in FIG. 8 is rewritten to "A (which is the same information as the file determining information of the second data in the data management information B)".

When the above updating process for the data management information is completed, the control element 101 determines that the data writing process corresponding to the write command is completed. When it is determined that the data writing process corresponding to the write command from the card reader/writer 12 is completed, the control element 101 transmits a status indicating that the data writing process is completed to the card reader/writer 12.

When data is read out from the data memory 102 with the above configuration, the control element 101 determines the newest data management information by the same process as the process containing the steps S11 to S18 and reads out the newest data based on the newest data management information.

According to the above data writing process, even if a problem occurs during the data writing process, the data management information is not updated. Therefore, data obtained immediately before starting the data writing process can be ensured. For example, even if a problem occurs during the process of writing data into the A file of the first data, data in the B file of the first data (the newest data at the starting time of the data writing process) is kept held. Further, data management information is not updated until the data writing process is correctly terminated. In this state, in the IC card, data of the B file of the first data is determined to be the newest data and data obtained immediately before starting the data writing process can be ensured at the time of interruption of the data writing process.

In the above data writing process, whether the newest data is stored in the first data area or the second data area is determined based on determination information stored in the management area, data is written into the data area in which data is determined not to be the newest data and the determination information is updated when the data writing process is correctly terminated. As a result, data obtained immediately before starting the data writing process can be ensured. Further, a long processing time is not required for the process of ensuring data. Therefore, the processing speed of an IC card having a data write ensuring function can be enhanced.

Next, a modification of the data writing process in the IC card 11 is explained.

In the mobile electronic device such as the IC card 11, one data having significance is written by performing a plurality of data writing processes in some cases.

For example, in the IC card 11, one data is divided and stored into a plurality of data files (EF) in some cases. In such a case, in the IC card 11, the data writing process is performed plural times in order to write data into respective data files. That is, when one data having significance is stored in a plurality of data files, the data is written into a plurality of data files by performing a data writing process plural times.

In a settlement system or entrance/exit management system utilizing the IC card, the data writing process is performed plural times in a series of transaction processes in many cases.

In the above cases, it is required to ensure the matching of data items in the whole portion of a plurality of data writing processes or in the whole portion of a series of transaction processes performed in order to write one data.

In this example, as a modification of the data writing process shown in FIG. 6, the process of ensuring whole data to be written by a plurality of data writing processes is explained.

Figure 9:
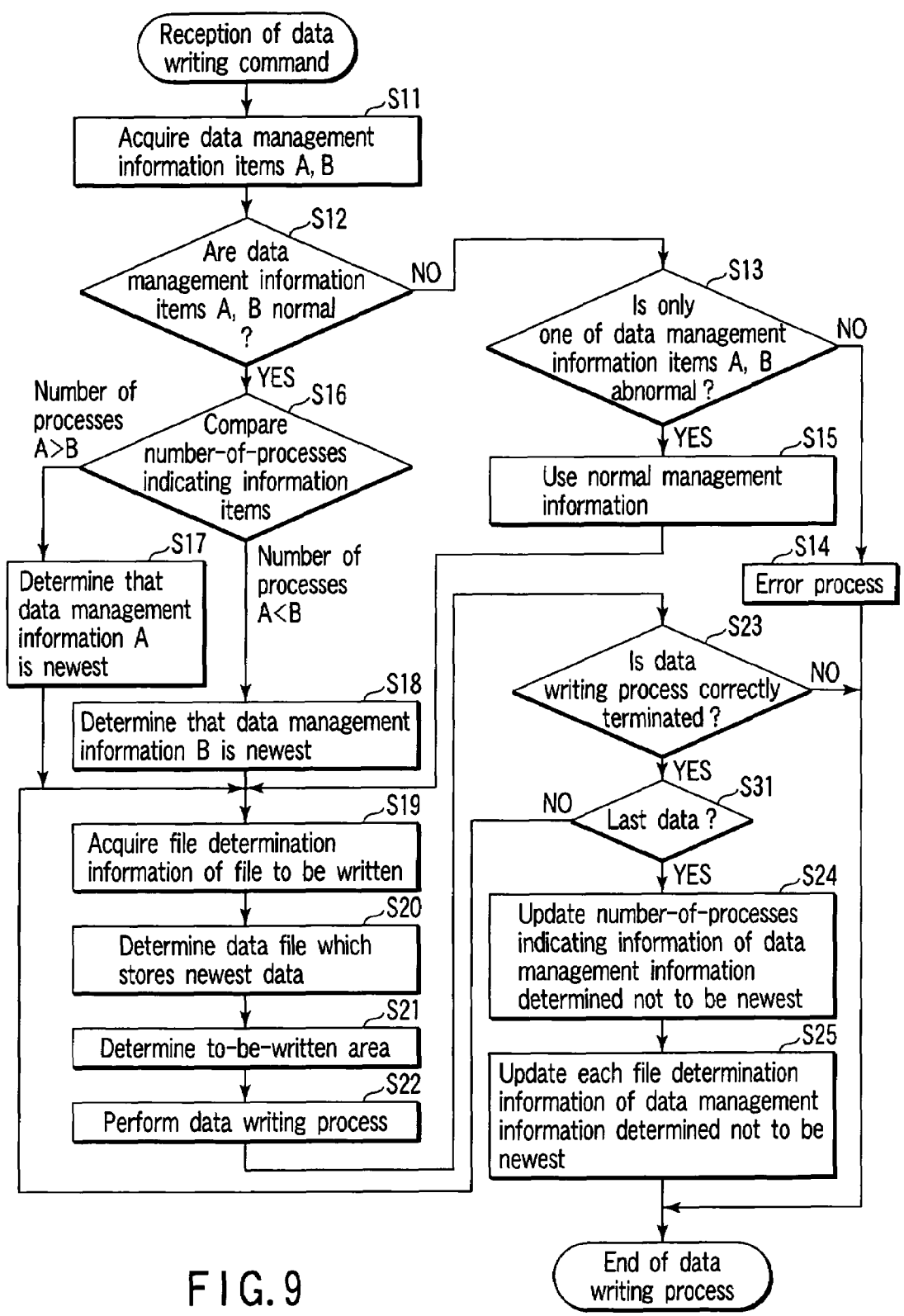
FIG. 9 is a flowchart for illustrating a modification of the data writing process.

FIG. 9 is a flowchart for illustrating the process of ensuring whole data to be written by a plurality of data writing processes. The process shown in FIG. 9 is a modification of the process shown in FIG. 6. Therefore in FIG. 9, portions which are the same as those of FIG. 6 are denoted by the same reference symbols and the detail explanation thereof is omitted.

In the process of ensuring data by the whole portion of a plurality of data writing processes, the control element 101 performs the process of the steps S11 to S23 in response to each data write command from the card reader/writer 12. That is, each time the data writing process corresponding to one data write command is correctly terminated ("YES" in the step S23), the control element 101 determines whether written data is the last data or not (step S31).

The card reader/writer 12 sequentially supplies a series of data write commands to the IC card 11 each time a status indicating completion of the data writing process corresponding to each write command is received. On the other hand, in the IC card 11, a status indicting completion of the write process is transmitted each time a process corresponding to each write command is completed.

Therefore, in the IC card 11, whether written data is the last data or not is determined based on commands sequentially supplied from the card reader/writer 12. For example, identification information indicating that data is the last data or not may be attached to a write command and the control element 101 may determine whether or not data is the last data based on the identification information attached to the received command. Further, identification information indicating the presence or not of a next command may be attached to the present write command and the control element 101 may determine whether or not data is the last data based on the identification information attached to the received command. Further, the control element 101 may determine that the last data is written based on a command indicating completion of a series of write processes from the card reader/writer 12.

That is, when it is determined in the above determination process that the written data is not the last data or that data to be next written is present ("NO" in the step S31), the control element 101 transmits a status indicating completion of the data writing process corresponding to the write command to the card reader/writer 12 and then proceeds the process to the step S19. In this case, the control element 101 performs the data writing process corresponding to a data write command next supplied from the card reader/writer 12 (steps S19 to S31).

Thus, the process of the steps S19 to S31 is repeatedly performed in the IC card 11 until the last data is written. As a result, a plurality of data items can be written into a plurality of data files without updating data management information in the IC card 11.

When it is determined in the above determination process that the written data is the last data or that data to be next written is no more present ("YES" in the step S31), the control element 101 proceeds the process to the steps S24, S25 and performs the process of updating the data management information.

In this case, in the updating process for data management information, number-of-processes indicating information of the data management information which is determined not to be the newest information is updated in the same manner as in the step S24 (step S24). Further, the control element 101 updates file determination information of each data file in which data in the data management information determined not to be the newest is written to information indicating a data area in which data is written. Further, the control element 101 updates file determination information of each data file in which data in the data management information determined not to be the newest is not written to the same information as file determination information of the data management information which is determined to be the newest information (step S25).

In a process of ensuring the matching of whole data items written by a series of plural data writing processes as described above, the data management information is updated when the data writing processes by the series of plural data writing processes are all correctly terminated. Thus, even when data items are written into a plurality of data files, the matching of whole data items written into a plurality of data files can be maintained and the whole data items for the series of plural data write processes can be ensured.

For example, when a problem occurs during a series of plural data writing processes and the process is interrupted, the data management information is not updated. Therefore, whole data obtained immediately before starting the series of plural data writing processes can be ensured. Further, a plurality of data items written by a plurality of write processes can be ensured in each data unit having significance. Since a process for ensuring data does not require a long time, the operation speed of the IC card having the data write ensuring function can be enhanced.

As described above, in the IC card of the present embodiment, the first and second data areas are set as an area which stores one data item and data is alternately written into the first and second data areas. Thus, data can be ensured without requiring a long time for a data writing process or a data ensuring process.

Further, in the IC card of the present embodiment, a management area which stores determination information used to determine whether the newest data is stored in the first data area or the second data area is provided. Then, data is written into a data area in which data determined not to be the newest data based on the determination information is stored and identification information is updated when the data writing process is correctly terminated. As a result, data can be ensured even if a problem occurs during the data writing process.

The above data writing process can also be applied to a non-contact type IC card or the like. Further, the form of the mobile electronic device to which the present embodiment is applied is not limited to the card form and a block form, rod form or other forms can be applied.

What is claimed is:

1. A mobile electronic device comprising:
a first data memory configured to store data;
a second data memory configured to store data equivalent to the data stored in the first data memory;
a determining section configured to determine which one of the data stored in the first data memory and data stored in the second data memory is newest data;
a writing section configured to perform a writing process with respect to one of the first and second data memories which stores data determined not to be the newest data by the determining section;
a management memory configured to store determination information indicating which one of the data stored in the first data memory and the data stored in the second data memory is the newest data such that the determining section determines one of the data memories which stores the newest data based on the determination information stored in the management memory,
wherein the management memory includes first and second management memories, and the determining section determines which one of information stored in the first management memory and information stored in the second management memory is the newest determination information and determines one of the data memories which stores the newest data based on the newest determination information.

2. The mobile electronic device according to claim 1, further comprising an updating section which updates determination information stored in the management memory which stores determination information determined not to be the newest information by the determining section each time a process of writing data into one of the first and second data memories is correctly completed.

3. The mobile electronic device according to claim 2, wherein identification information indicating which one of the management memories stores the newest determination information is stored together with the determination information in the first and second management memories, the determining section determines which one of determination information items stored in the management memories is the newest information based on the identification information stored in the first management memory and the identification information stored in the second management memory, and the updating section updates the determination information and identification information stored in one of the management memories which stores determination information determined not to be the newest information by the determining section each time a process of writing data into one of the first and second data memories is correctly completed.

4. The mobile electronic device according to claim 3, wherein number-of-processes indicating information is stored in the first and second management memories as identification information indicating which one of the management memories stores the newest determination information, and the determining section determines which one of determination information items stored in the first and second management memories is the newest information based on the number-of-processes indicating information items stored in the first and second management memories.

5. A mobile electronic device comprising:
a first data memory configured to store data;
a second data memory configured to store data equivalent to data stored in the first data memory;
a determining section configured to determine which one of data stored in the first data memory and data stored in the second data memory is newest data;
a writing section configured to perform a writing process with respect to one of the first and second data memories which stores data determined not to be the newest data by the determining section;
a management memory configured to store determination information indicating which one of the data stored in the first data memory and the data stored in the second data memory is the newest data such that the determining section determines one of the data memories which stores the newest data based on the determination information stored in the management memory;
wherein each of the first and second data memories includes a plurality of data memories corresponding to each data unit and which further comprises an updating section which updates determination information stored in the management memory when one whole data is written into a plurality of data memories by a plurality of writing processes by use of the writing section, and
wherein the management memory includes first and second management memories, and the determining section determines which one of determination information items stored in the first and second management memories is the newest determination information and determines one of the data memories which stores the newest data based on the newest determination information.

6. The mobile electronic device according to claim 5, wherein the updating section updates determination information stored in the management memory which stores determination information determined not to be the newest information by the determining section when one whole data is written into a plurality of data memories by a plurality of writing processes by use of the writing section.

* * * * *